Feb. 18, 1964 L. E. LEVINSON 3,121,238
BOATS
Filed Aug. 15, 1960 7 Sheets-Sheet 1

INVENTOR
Louis E. Levinson

BY *Walter J. Jagm*

ATTORNEY

Feb. 18, 1964 L. E. LEVINSON 3,121,238
BOATS
Filed Aug. 15, 1960 7 Sheets-Sheet 2

INVENTOR
Louis E. Levinson
BY
ATTORNEY

Feb. 18, 1964  L. E. LEVINSON  3,121,238
BOATS

Filed Aug. 15, 1960  7 Sheets-Sheet 4

INVENTOR
Louis E. Levinson

BY Walter J. Jugen
ATTORNEY

Feb. 18, 1964   L. E. LEVINSON   3,121,238
BOATS
Filed Aug. 15, 1960   7 Sheets-Sheet 6

INVENTOR
Louis E. Levinson

BY Walter J. Jagmin
ATTORNEY

United States Patent Office  3,121,238
Patented Feb. 18, 1964

3,121,238
BOATS
Louis E. Levinson, 6458 Royal Lane, Dallas, Tex.
Filed Aug. 15, 1960, Ser. No. 49,477
8 Claims. (Cl. 9—1)

This invention relates to boats and more particularly to sectional boats.

This application is a continuation-in-part of my co-pending application, Serial No. 854,034, filed November 19, 1959.

An object of this invention is to provide a new and improved boat having two sections pivotally secured together whereby one section may be pivoted to a position overlying the other.

Another object of the invention is to provide a boat having a front section and a rear section wherein the front section may be pivoted to a position over the rear section, the rear section being provided with wheels whereby the boat may be used as a trailer when the front section is moved to a fully closed position over the rear section.

Still another object is to provide a boat having a front section and a rear section wherein the front section is provided with a cabin formed of a collapsible roof, windshield and side panels whereby the front section may be pivoted to a horizontal position over the rear of the boat when the cabin is collapsed.

A further object is to provide a boat having a front section, provided with a cabin formed of a windshield, side panels and a roof, which is pivotally connected to a rear section whereby the front section may be moved to a position angularly overlying the rear section and the windshield and roof may be extended rearwardly of the rear section together with auxiliary canvas panels to form a large shelter extending from between the boat sections and beneath the windshield and the roof.

A still further object of the invention is to provide a sectional boat having a cabin formed of sections pivotally secured to the front section or to each other whereby the cabin sections may be moved to collapsed or retracted positions within the front section or be extended to form a shelter in conjunction with the rear section of the boat.

Another object is to provide a boat having two sections pivotally secured together and having biasing means for counterbalancing the weight of one section of the boat throughout its pivotal movement from a fully extended position relative to the other section to a position overlying the other section.

Still another object of the invention is to provide a biasing means connected to two sections of a sectional boat wherein the biasing means first exerts a force tending to raise one section of the boat while it is being moved to an upright position relative to the other section and then exerts a force tending to prevent downward movement of such section in the same pivotal direction toward the position wherein the one section overlies the other section.

A further object is to provide a new and improved means for coupling two sections of a boat in rigid, stressed relation to one another.

A still further object is to provide a new and improved boat having ground engaging wheels which are retractable into wells provided with horizontally slidable doors for closing the lower ends thereof.

Another object is to provide a new and improved boat wherein the doors of the wheel wells are slidably mounted in elongate downwardly projecting housings which form lift or hydroplane surfaces whereby the resistance offered to the boat at high speeds is decreased.

Still another object is to provide a new and improved boat having retractable wheels mounted in downwardly opening wheel wells wherein the slidable doors closing the lower ends of the wheel well does not entirely close the lower rear end of the wheel well to form a venturi opening through which any water which may be in the wheel wells is withdrawn by forward movement of the boats through the water.

A further object is to provide a boat having a new and improved means for moving the slidable doors of the wheel wells between retracted and fully closed positions.

Another important object of the invention is to provide a boat having rear and front sections and power means for moving the forward section between its fully extended position relative to the rear section and its position overlying the rear section.

Still another object is to provide hydraulic means mounted in one section of the boat and connected by a suitable linkage to the other section of the boat for imparting pivotal movement to the forward section of the boat relative to the rear section of the boat.

A further object is to provide a new and improved boat wherein the hydraulic means is mounted in such a manner as not to impart any stresses to the boat section in which it is mounted.

A still further object of the invention is to provide a new and improved means for moving a forward section of a boat between its extended position relative to the rear section and its position overlying the rear section of the boat wherein the control means for the operation of the power means are accessible from the exterior of the boat when the forward section is in its position overlying the rear section.

Additional objects and advantages of the invention will be readily apparent from the reading of the following description of a device constructed in accordance with the invention, and reference to the accompanying drawings thereof, wherein:

Referring now to the drawings, the boat 20 includes a rear section 21 pivotally secured to a front section 22 by a hinge 23. The rear section is provided with a bottom 26 from which extend upwardly the rear and front walls 28 and 29 and the side walls 30 and 31. The upper portion of the rear wall forms a transom to which an outboard motor may be removably secured to propel the boat through the water. The rear section also has a top deck 32 which extends inwardly from the side and end walls of the boat and is provided with a pair of upwardly extending side flanges 33 and 34. A motor well 35 is formed by the upper transom portion of the rear well, a transverse wall 36, side walls 37 and 38 and a bottom wall 39. The inner well wall 36 is provided with a pair of brackets 40 for a purpose to be described below.

The rear section has a pair of wheel wells 42 and 43 in which are retractible the ground engaging wheels 44. The wells are provided with bottom doors 45 which may be closed when the wheels are in their retracted positions. The open upper ends of the wheel wells are closed by covers 46 pivotally secured to the wells in any suitable manner, as by hinges 47. The manner in which the wheels and the doors are constructed and mounted is more fully described in the co-pending application referred to above.

The rear section of the boat has a keel and draw bar member 50 whose lower portions extend below the lower surface of the bottom 26 of the rear section to form a keel and whose forward portion is provided with a hitch member 52 by means of which the draw bar member may be connected to any suitable towing vehicle.

The front wall 29 of the boat is provided with a boss 53 receivable in a socket 54 provided in the rear wall 55 of the front section 22. The rear wall of the front section has a seat 56 which provides the socket whose configuration is similar to that of the boss 53 whereby the boss is received in the socket 54 when the front section is in the fully extended position illustrated in FIGURES 1 through 4. The boss and seat member are provided with suitable aligned apertures in which are receivable the pins 58 to secure the front and rear sections together.

The forwardly extending portion of the draw bar is receivable in the groove means 60 provided in the under surface of the bottom 62 of the front section when the front section is in the fully extended position illustrated in FIGURES 1 through 4 of the drawing. The bottom 62 is also provided with a connector member 64 which engages with the cooperating means 65 of the draw bar member 50 to rigidly secure the two sections together into fully extended positions. The exact structure of the cooperable connector members 64 and 65 is fully described in the co-pending application referred to above.

The bottom 62 of the front section curves upwardly, as at the forward end portion 66, between the bow planes 67 and 68. The sides 70 and 71 of the front section extend upwardly from the bottom and between the rear side 55 and the bow planes. The front section has a top deck 72 which extends inwardly from the side and rear walls and from the forward end portion 66 of the bottom. The top deck 72 has side sections 74 and 75 which extend inwardly of the sides 70 and 71, respectively, a rear section 77 which extends forwardly and inwardly of the rear wall 55 and a front section 78 which extends from the bottom wall. A weather flange 80 extends upwardly from the inner edges of the top deck.

A landing and launching wheel 82 is detachably securable to the front end of the front section by means of the curved bracket 83 receivable in a groove 84 in the forward end portion 66 of the bottom of the front section and whose vertically extending upper end portion 85 is receivable in a tubular socket 86 which extends upwardly through the forward portion of the front section of the boat. The bracket 83 may be secured to the tubular socket by means of a pin 87 insertable through aligned apertures in the vertical end portion 85 of the bracket and the tubular bracket. The ground engaging landing and launching wheel 82 may be of the caster type whereby it may swivel or rotate about a vertical axis as required during travel of the boat.

The cabin 90 secured to the front section includes a windshield having upper and lower sections 92 and 93, a roof 94, upper side panel sections 96 and 97 and lower side panel sections 98 and 99. The lower windshield section 93 is secured to the forward end portion 66 of the front section by laterally spaced hinged link assemblies 100 each of which includes a link 101 pivotally secured at one end to the deck 72 of the front section in any suitable means, as by a pivot pin 102, and a second hinge link 103. One end of each of the links 103 is pivotally secured by any suitable means such as a pin 104 to the other end of its associated hinge link 101 and its other end is similarly pivotally secured to the lower windshield section 93 by means of a pin 105a.

It will be apparent that the hinge link assemblies 100 permit the windshield sections to be moved to a folded position wherein the windshield sections are disposed in the interior of the front section inwardly of the side sections of the top deck 72. The windshield can be moved rearwardly and downwardly between the side sections 74 and 75 of the top deck since the side sections diverge laterally outwardly and rearwardly. The hinge links also permit the windshield sections 92 and 93 to be moved to the extended position illustrated in FIGURES 5 and 6 wherein the windshield section projects outwardly of the rear end of the rear section of the boat when the front section is in a position wherein it angularly overlies the rear section.

Figures 8, 9, 10, 16, 17, 18:
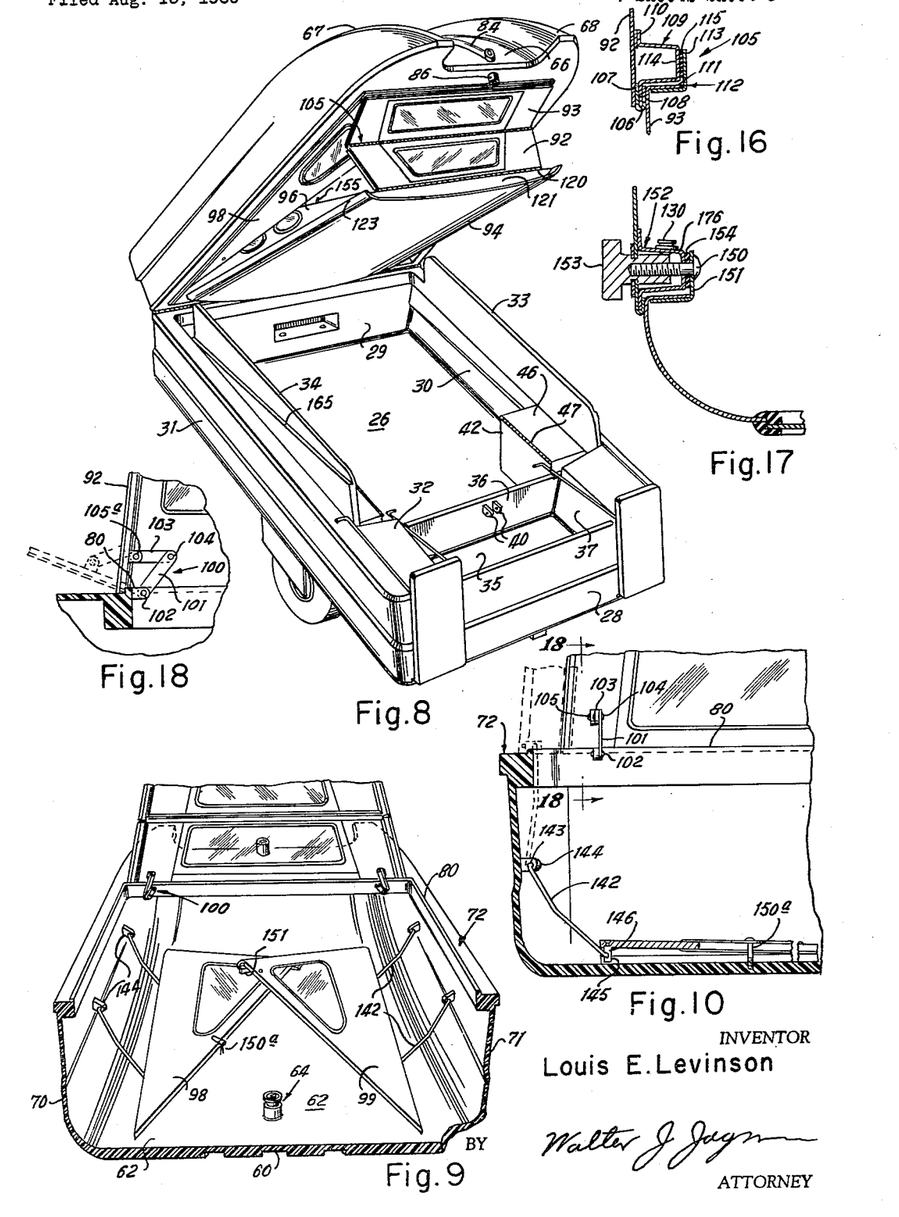
FIGURE 8 is a perspective view showing the manner in which the cabin sections fold into the front and rear sections when the rear section is moved toward the fully closed position illustrated in FIGURE 7.
FIGURE 9 is a fragmentary view showing the manner in which the lower side panel sections are movably secured to the front section.
FIGURE 10 is a fragmentary sectional view showing the lower side panel sections in retracted position.
FIGURE 16 is a sectional view taken on line 16—16 of FIGURE 3.
FIGURE 17 is a sectional view taken on line 17—17 of FIGURE 2.
FIGURE 18 is a fragmentary sectional view taken on line 18—18 of FIGURE 10.
Figure 11:
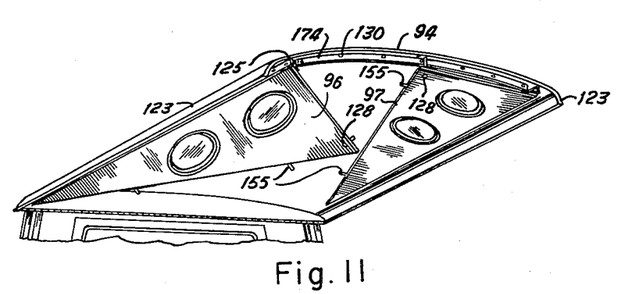
FIGURE 11 is a fragmentary perspective view showing the manner in which upper side panel sections of the cabin are secured to the roof cabin section.
Figure 12:
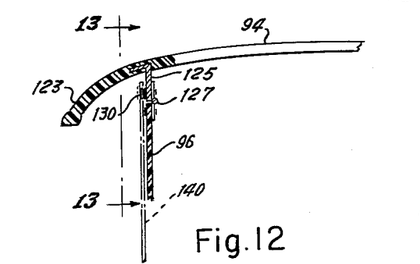
FIGURE 12 is an enlarged fragmentary sectional view showing the manner in which the upper side panel sections of the cabin are hingedly secured to the roof.
Figure 13:
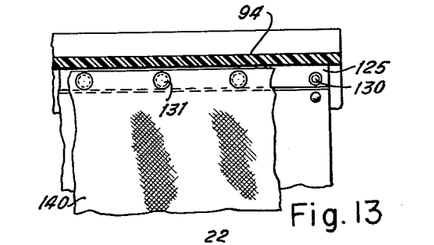
FIGURE 13 is a sectional view taken on line 12—12 of FIGURE 12.
Figure 14:
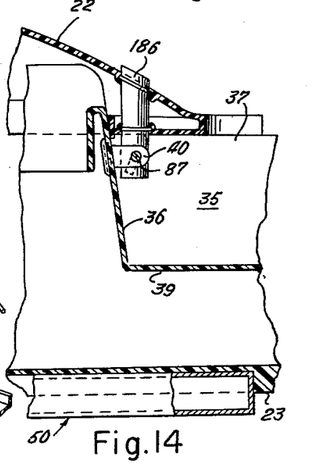
FIGURE 14 is a fragmentary partly sectional view showing the manner in which the front section of the boat is locked to the rear section when in fully closed position thereon.

The windshield sections are connected by any suitable hinge means 105, FIG. 16. The hinge means 105 includes the pin 106 and plates 107 and 108. The plate 107 is served, as by welding to the lower edge portions of the upper windshield section and the plate 108 is similarly served to the upper edge portion of the lower windshield section. A bead 109 is served to the upper windshield section and the hinge plate 108 in any suitable manner, as by welding. The inturned flange 111 of the lower section has an angle 112 secured thereto, as by welding, whose leg 113 is adapted to be disposed parallel to the web 114 of the bead when the windshield sections are in the extended positions illustrated in FIGURES 1 through 4. Suitable resilient seal means 115 may be secured to the leg 113 to seal between the web and flange 113. The hinge thus makes watertight connection between the windshield sections.

Figure 7:
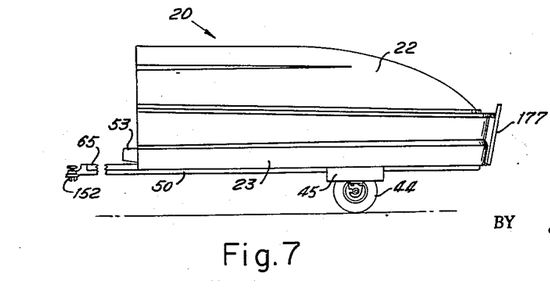
FIGURE 7 is a side elevation of the boat showing the front section pivoted to fully closed position on the rear section to form a trailer cart with the cabin sections disposed therein.

The upper edge of the upper panel section 93 is pivotally secured in any suitable manner, as by a piano hinge 120, to the forward dependent flange 121 of the roof section 94 whereby the roof section may be pivoted about the hinge 120 in the manner illustrated in FIGURE 8 in order that the roof section fold on the windshield sections and be receivable between the side flanges 33 and 34 of the rear section. The top deck 32 converges inwardly rearwardly so as to permit the roof to be received therein when the front section of the boat is moved to the fully closed position over the rear section as illustrated in FIGURE 7.

The roof section 94 has curved or flange lateral edge portion 123 from which are spaced inwardly the support brackets 125 which extend longitudinally of the roof and parallel to the side portions 123 thereof. The upper side panel sections 96 and 97 are secured to the support brackets 125 by any suitable means, such as the hinges 127, whereby the upper panel sections may be pivoted between their extended positions wherein they extend downwardly and outwardly at an angle, as illustrated in FIGURES 1, 2, 3 and 4 and a retracted position, illustrated by the upper panel section 97, wherein the panel sections lie adjacent the rear panel and roof section. The panel sections may be rigidly secured to the roof by any suitable means, such as the screws 128 which extend through the panels into suitable threaded bores or sockets in the roof panel. The support brackets may also be provided with suitable fasteners 130 cooperable with complementary fasteners 131 whereby the canvas shelter panels 140 may be secured to the roof section when it is in the extended positions illustrated in FIGURES 5 and 6.

The lower panel sections are pivotally secured to the sides 70 and 71 of the front section by means of hinge links 142 whose lower angularly extending ends 143 extend through suitable lugs or brackets 144 secured to the side walls 70 and 71 of the boat by any suitable means. The upper angularly extending end portions 145 of the pivot or hinge links 142 extend through suitable lugs or brackets 146 secured to the lower side panel sections 98 and 99. The brackets 144 extend rearwardly at an angle from the side walls 70 and 71 whereby the side panel sections may be moved rearwardly to clear the front section of the deck as the hinge or pivot links are pivoted inwardly and then downwardly into the front section to the retracted position illustrated in FIGURES 8 and 9. The lower side panel sections 98 and 99 of course may be secured to the bottom 62 in any suitable manner, as by brackets 150 which extend through the lower side panel sections and into the suitable threaded bores or sockets provided in the bottom 62 of the boat.

It will be apparent that the provision of the hinge link assemblies 100 for the lower windshield section and the hinge links 142 for the lower side panel sections permit the side panel sections to be positioned outwardly of the weather flange of the front sections when the front sections are in their cabin forming positions illustrated in FIGURES 1 through 4 so that the water will not enter the boat therebetween.

Figure 1:
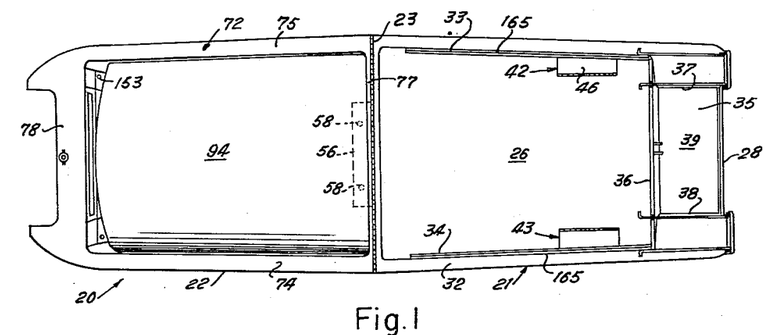
FIGURE 1 is a top plan view of the boat embodying the invention.
Figure 2:
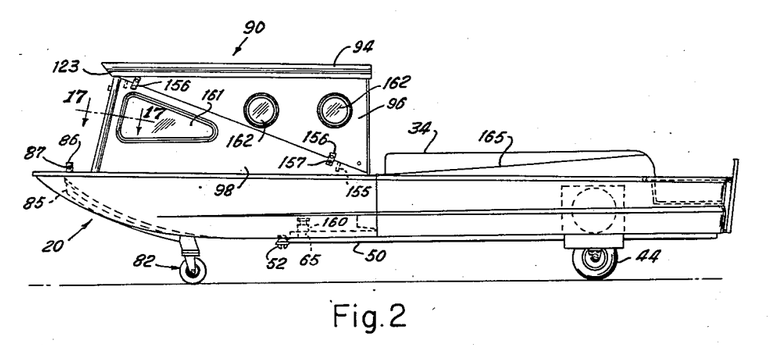
FIGURE 2 is a side elevation of the boat.
Figure 3:
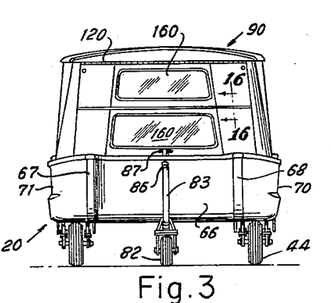
FIGURE 3 is a front plan view of the boat of FIGURES 1 and 2.
Figure 4:
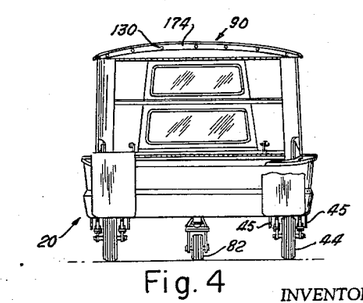
FIGURE 4 is a rear plan view of the boat illustrated in FIGURE 1.

When it is desired to assemble the cabin sections to form the cabin illustrated in FIGURES 1, 2, 3 and 4, the windshield sections 92 and 93 are unfolded to the substantially upright position illustrated in FIGURES 2 and 3 and while the roof and the roof panels and the upper side panel sections 96 and 97 are held upwardly out of the way, the lower panel sections 98 and 99 are moved upwardly and then forwardly and then pivoted to their raised positions illustrated in FIGURES 1 through 4 with their forward edges abutting the lateral side edges of the windshield sections. The windshield sections are secured to the forward inwardly curved portions of the lower panel sections by means of the bolts 150 which extend through the leg 151, the bead 152 and the windshield sections on each side thereof into the nuts 153 secured to the windshield sections. The beads may be welded to the windshield sections and a resilient seal or gasket 154 may be interposed between the leg 151 and the bead to provide a watertight connection therebetween.

The roof with the upper side panel sections 96 and 97 extending downwardly and slightly outwardly is then pivoted downwardly about the hinge pin 120 to cause the lower edges of the upper panel sections to rest upon the upper edges of the lower side panel sections. The upper panel sections may be provided with connector pins 155 which extend in suitable upwardly opening apertures or bores of the side panel sections to hold the upper and lower sections against movement relative to one another.

If desired, suitable bars 156 may be secured to the upper and lower sections by means of screws 157 received in suitable threaded bores in the side panel sections to further secure the sections to one another. Since the roof is secured to the upper side panel sections 97 and 96, it is also rigidly held secured to the lower side panel sections whereby the cabin sections form a suitable cabin.

The windshield of course is provided with windows 160 and the side panels may be provided with suitable windows 161 and 162 of glass or plastic.

When it is desired to use the boat as a shelter, the connecting bars 156 are detached from the upper and lower side panel sections and the roof is raised to permit the upper panel sections 96 and 97 to be pivoted under the roof section 94 and be secured thereto by the screws 97. The roof section 94 and the windshield sections 92 and 93 are then extended to the positions illustrated in FIGURES 5 and 6 and the front section is moved angularly about its hinge 23 to the position illustrated in FIGURES 5 and 6 wherein it angularly overlies the rear section with the outer edges of the lower panel sections 98 and 99 resting upon the upwardly and rearwardly inclined shoulders 165 of the side flanges 33 and 34 of the rear section whereby the lower side panel sections support the front section in the shelter forming position illustrated in FIGURES 5 and 6. The lower side panel sections of the front section may be secured to the side flanges 33 and 34 in any suitable manner, as by bars 167 and screws 168 which extend through suitable apertures in the bars 167 into suitable threaded bores or sockets in the panel sections and the side flanges.

The roof and the outer ends of the windshield section 93 may then be supported in the substantially horizontal raised positions by means of poles 170 whose lower ends may be driven into the soil and whose upper ends abut the lower interior surfaces of the roof panel and of the upper windshield section 93. The canvas panels 140 may then be secured by means of the fasteners 130 and 131 to the support brackets 125 of the roof. The forward flaps 171 may similarly be secured to the rear flange 174 of the roof by means of similar complementary fasteners 130 and 131. The upper edges of the side panels 175 which may be of canvas are similarly secured to the edges of the windshield sections 92 and 93 by similar fasteners, 130 and 131, the fasteners 130 being mounted on the sides 176 of the beads 152.

It will be apparent that the shelter panels 175 are cut out at their lower rear portions to conform to the shape of the rear end of the boat.

The rear end wall of the rear section of the boat is provided with a pair of plates 177 which are secured adjacent the lower end of the boat to the rear wall by any suitable means, as by pins 178. The plates may be held in the extended positions illustrated in FIGURE 15 by means of links 180 whose upper ends engage in suitable brackets 181 to hold the plates in the lower extended positions illustrated in FIGURE 15. When not in use, the links 180 extend over the rear portions of the top deck and are received in groove 182 of the deck 32.

The plates obviously may be used as steps to enter into the rear section when the boat is being used as a shelter, the rear section of the boat being especially adapted to be used as sleeping accommodations of the large shelter formed by the boat in combination with the canvas panels.

In use, the boat may be used as a cabin cruiser when the front section is secured in the extended positions illustrated in FIGURES 1 through 4 by means of the draw bar member 50 and the connecting members 64 and 65 in conjunction with the boss 53, socket 54 and the connecting pine 58. The boat may readily be launched while the wheels 44 are in the extended positions illustrated. The landing and launching wheel 83 assists in the landing and launching operations by preventing the bow of the front section from engaging the ground during such launching and landing operation. When the boat is afloat, the landing and launching wheel 82 is detached by removal of the pin 87 which permits the upper end of the bracket 83 to be moved downwardly out of the tubular socket 86 and then placed in the boat. The rear wheels 44 may then be retracted in the manner illustrated and described in my aforesaid co-pending application whereupon the boat may then be propelled on the surface of the water by a suitable outboard motor secured to the transom formed by the upper end of the rear wall 28.

Figure 15:
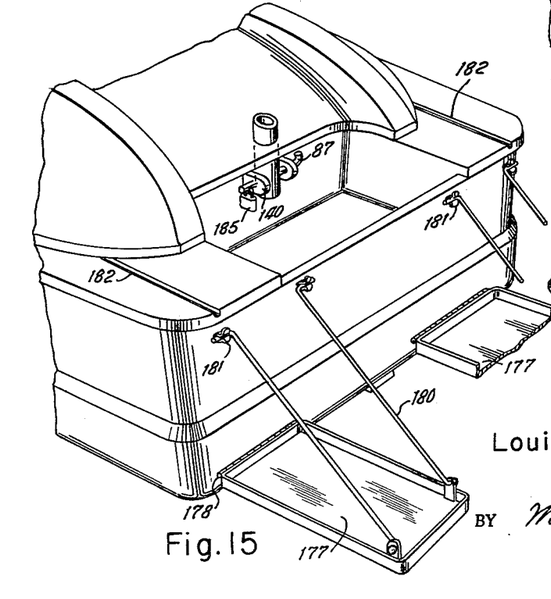
FIGURE 15 is a fragmentary perspective view of the rear end of the boat with the front section in fully closed position overlying the rear section.
Figure 20:
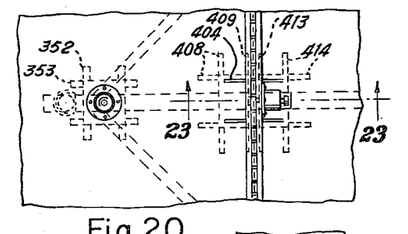
FIGURE 20 is a fragmentary top plan view showing a modified means for coupling the two sections of the boat to one another when in fully extended positions.

The plates may be moved to their extended positions illustrated in FIGURE 15 during travel on the water to prevent undue pitching or movement of the boat and prevent the lowering of the stern of the boat unduly into the water due to the action of the propeller of the outboard motor.

When it is desired to land the boat and transport it from one location to another, the landing and launching wheel is again secured to the front end of the front section of the boat by means of the pin 87. The wheels 44 are then moved to their extended ground engaging positions 44 and the boat is then drawn up on the shore. The cabin sections are then disconnected from one another by removal of the screws 157 and 156 to permit the lower panel sections to be folded inwardly into the front section, as illustrated in FIGURE 9. The windshield sections are then pivoted inwardly, as illustrated in FIGURE 8, whereby the front section of the boat may then be pivoted about its hinge pin 23 to the fully closed position illustrated in FIGURE 7. The roof 94 swings inwardly into the rear section between the side flanges 33 and 34 of the top deck since the configuration of the interior of the opening provided by the top deck is similar to and slightly larger than that of the roof section. The front section may be secured to the rear section in closed position by means of the hinge pin 87 which may extend through the apertures in the brackets 40 of the rear section and through suitably aligned aperture of the tubular socket 86.

If desired, a padlock 185 may extend through a suitable aperture of the pin 87 to prevent its withdrawal, the other end of the pin 87 being curved or displaced angularly from its elongate portion. The launching wheel is then detached from the front section, and if desired, stored within the rear section. With the front section in its fully closed position, the hitch member 52 of the draw bar member 50 of the rear section may be secured by a complementary hitch member to a towing vehicle whereby the boat, now converted into a trailer cart, may be transported from one location to another. The outboard motor may be left secured to the transom during transport since the front section when in its fully closed position does not extend rearwardly past the wall 36 of the motor well of the rear section.

It will now be apparent that a boat having a cabin has been illustrated and described which may be easily converted into a trailer cart of relatively short turning radius or into a shelter.

It will further be seen that a boat having a front and rear section has been illustrated and described wherein the front section is provided with a cabin formed of sections which are collapsible into the front section whereby the front section may be pivoted to a fully closed position overlying the rear section.

It will further be apparent that the front section of the boat has a pair of lower panel sections pivotally mounted thereon by means of the pivot or hinge pins 142 and which are movable to raised positions exteriorly of the weather flange 80 of the front section to form the lower side sections of the cabin, that the windshield sections of the cabin are pivotally secured to the forward portion of the front section by means of hinge link assemblies 100 whereby the windshield sections may be moved to the raised positions from retracted positions within the front section and that the roof section 94 pivotally secured to the upper edge portions of the windshield sections is provided with upper side panel sections which are connectible to the lower panel sections.

It will further be seen that when the front section of the boat is moved to a position where it angularly overlies the rear section, the lower side panel sections 98 and 99 engage the upwardly facing shoulders 165 of the side flanges 33 and 34.

It will further be seen that the roof section and the windshield sections of the cabin are provided with means for fastening flexible panels of canvas or the like to extend the shelter formed by the front and rear sections of the boat when the front section is in a position overlying the rear section.

Figures 5, 6, 19:
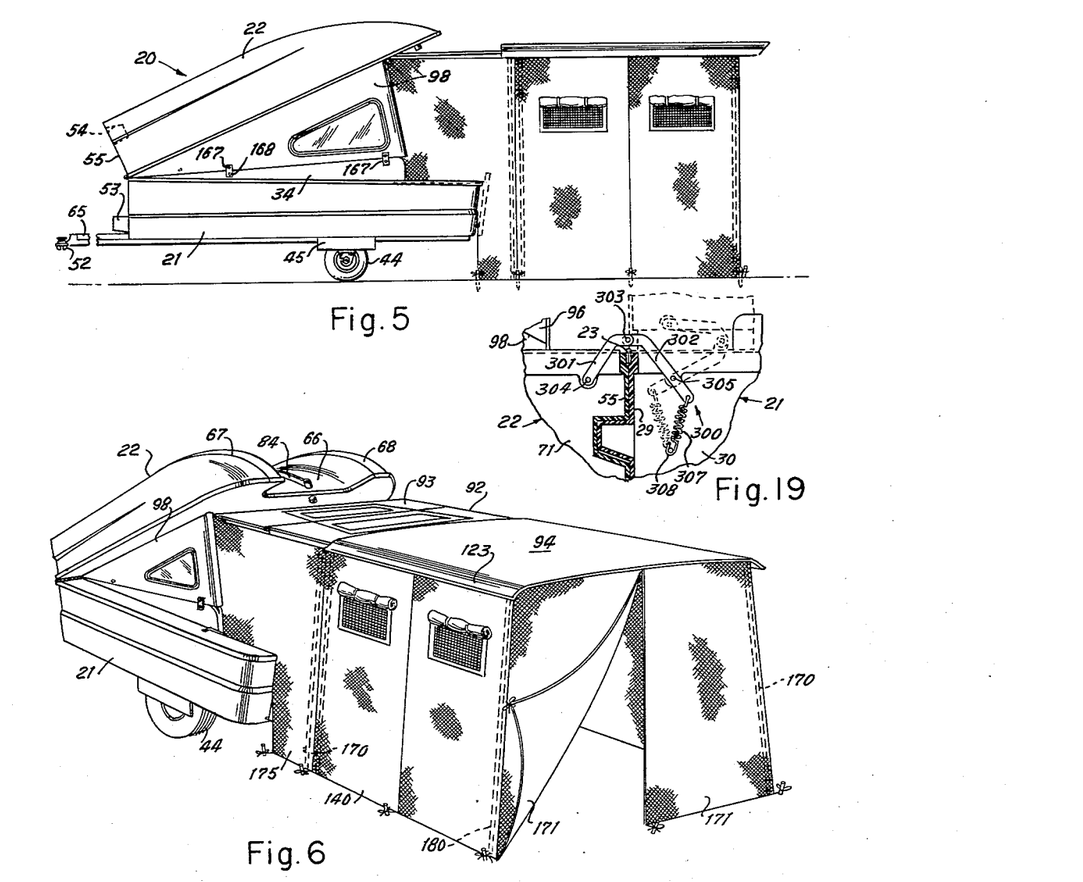
FIGURE 5 is a side elevation showing the front section of the boat angularly overlying the rear section thereof and with the cabin sections in extended positions forming a shelter in conjunction with canvas panels.
FIGURE 6 is a perspective view of the shelter illustrated in FIGURE 5.
FIGURE 19 is a fragmentary vertical sectional view showing a biasing means for counterbalancing the weight of the forward section during its pivotal movement between its fully extended position and its position overlying the rear section.

In FIGURE 19 is illustrated a biasing assembly 300 for counterbalancing the weight of the front section 22 during its movement between its fully extended position relative to the rear section 21 and its position wherein it overlies the rear section. The biasing assembly includes a pair of links 301 and 302 whose adjacent ends are pivotally connected by any suitable means, such as a pivot pin 303. The other end of the link 301 is pivotally connected to the front section 22 by a pivot pin 304 while the link 302 is connected intermediate its end to the rear section 21 by a pivot pin 305. The end of the link 302 remote from the pin 303 is connected to one end of the biasing spring 307 whose other end is connected by means of its hooked end to a pin 308 secured to a side wall of the rear section.

When the rear front section is in the fully extended position indicated in full lines in FIGURE 19, the spring 307 is under tension and exerts a force on links 302 and 301 which tends to cause the front section 22 to pivot upwardly about the hinge 23 towards a position wherein the front section extends upwardly at an angle of approximately ninety degrees relative to the rear section. As a result when the front section is pivoted upwardly in a clockwise direction about the hinge 23 (FIG. 19) the spring 307 is effective to counterbalance a portion of the weight of the front section during such upward movement of the rear section when the front section moves more than ninety degrees and commences to move downwardly on the rear section, the end of the spring 307 attached to the link 302 passes to the left, FIGURE 1, of a line passing through the pivot pin 305 and the pin 308 whereby further downward movement of the rear section increases the tension on the spring 307 whereby the spring 307 now exerts a force on the front section which tends to resist such continued downward movement. It will be apparent that when the front section is being moved from the position wherein it overlies the rear section to its fully extended position, the force of the spring 307 is first effective to counterbalance the weight of the front section and tend to move it in an upward counterclockwise (FIG. 19) direction about the hinge pin 23 until the front section extends at an angle of ninety degrees from the rear section and then exerts a force which tends to prevent further counter-clockwise movement of the rear section towards the fully extended position.

In this manner the biasing assembly 305 decreases the force which must be exerted by the person lifting the front section about its hinge pin 23 both in moving the front section from the fully extended position to a position overlying the rear section and from a position overlying the rear section to the fully extended position.

A pair of the biasing assemblies 300 may be provided at each side of the boat. The side panel sections of each side may be made somewhat shorter than the full length of the rear section in order not to interfere with the movements of the links of the biasing assemblies 300.

Figures 22, 23, 24:
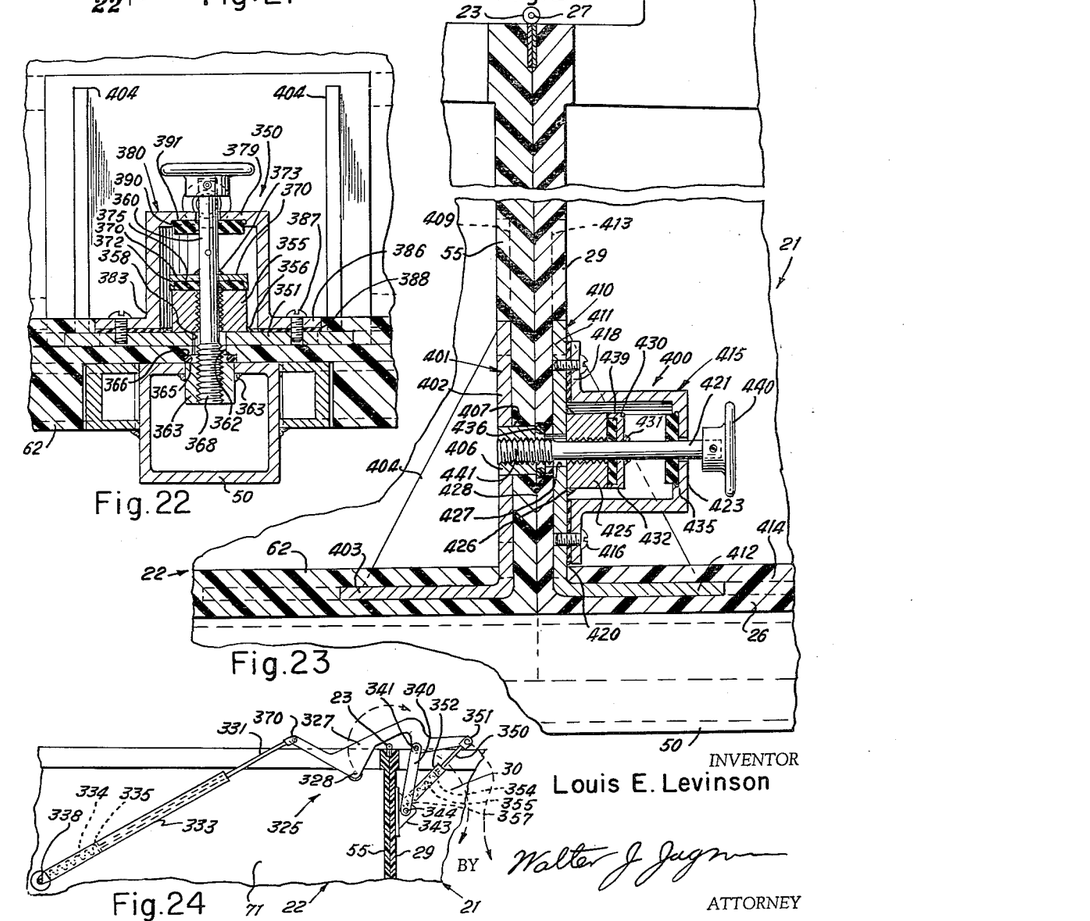
FIGURE 22 is an enlarged sectional view taken on line 22 of FIGURE 21.
FIGURE 23 is an enlarged sectional vertical view taken on line 23 of FIGURE 20.
FIGURE 24 is a fragmentary sectional view showing a modified form of the biasing means for counterbalancing the weight of the front section during its pivotal movement between its fully extended position and its position overlying the rear section.

In FIGURE 24 is illustrated a modified biasing assembly 25 for counterbalancing the weight of the front section 22 during its movement between its fully extended position and its position overlying the rear section 21 of the boat. The biasing assembly 325 includes a main link 327 pivotally connected by any suitable means, such as a pivot pin 328, to the front section of the boat at a point spaced below the hinge pin 23 which connects the two sections of the boat together. One end of the main link is pivotally connected, as at 330, to a plunger rod 331 whose other end telescopes in a tubular housing 333 having a compression spring 334. The plunger 331 may be provided with an enlarged flange 335 at its lower end which engages one end of the spring 334, the other end of the spring engaging the closed end of the spring housing 333. The spring housing is pivotally secured at one end as at 338, to a side wall of the front section 22 by any suitable means, such as a pivot pin.

The main link is movably connected to the rear section 21 of the boat by an auxiliary link 340, one of whose ends is connected by any suitable means, such as a pivot pin 341, to the main link 327 and the other end thereof is pivotally attached to a bracket 343 rigidly secured in any suitable manner to the front wall 29 of the rear section. The auxiliary link is pivotally secured to the bracket 343, by any suitable means, such as a pivot pin 344. It will be noted that the pin 341 and the pin 328 are disposed rearwardly and forwardly, respectively, of the hinge 23 pivotally connecting the two sections of the boat to one another.

The other end of the main link 327 is connected to a plunger 350 by any suitable means, such as a pivot pin 351. The plunger rod extends into a spring housing 352 and has an enlarged end 354 which bears one end of a compression spring 355 whose opposite end bears against the closed end of the spring housing 352. The spring housing is pivotally secured at one end, as at 357, to the bracket 343.

The spring 334 is under compression when the front section is in a fully extended position illustrated in FIGURE 24 and exerts a force tending to pivot the main link 327 about the pivot pin 328 in a clockwise manner and, since the main link is also pivotally connected to the auxiliary link 340, the force of the spring 334 also tends to cause pivotal movement of the front section 22 about the hinge 23 in a clockwise manner toward an upright position relative to the rear section 21. In this manner the spring 334 decreases the upward force that it is necessary to exert on the front section to move it towards the position wherein it overlies the rear section. The spring 355 is in substantially fully extended position when the front section is disposed substantially perpendicularly relative to the rear section since the pivots 328, 341 and 344 are so chosen that during the upward movement of the front section to a position wherein it extends substantially at right angles to the rear section, the pivot 351 describes the path indicated by the broken line in FIGURE 24 wherein there is no tendency of the point 351 to move toward the pivot point 357 and thus cause compression of the spring 355. However, when the front section is disposed at substantially right angles to the rear section further clockwise and now downward movement of the front section causes the point pin 351 to move towards the point pin 357 and thus cause compression of the spring 355 which then exerts a force tending to counterbalance the weight of the front section so that a lesser force is needed to prevent the front section from moving downwardly in the clockwise direction toward the rear section. The spring 355 is then compressed further as downward movement of the front section takes place on the rear section until the front section is in the position on the rear section illustrated in FIGURE 7. The spring 355 is then under compression so that when it is desired to raise the front section 22 back towards its fully extended position, the force of the spring 355 aids in lifting the front section in a counter clockwise manner about the hinge 23 until the front section is in the substantially perpendicular position relative to the rear section whereupon further downward movement in a counter-clockwise direction of the front section tends to cause compression of the spring 334 which then resists such further downward movement and tends to counterbalance the weight of the front section during continued downward movement of the front section from its substantially perpendicular position toward the fully extended position.

It will now be apparent that the biasing assemblies 300 and 325 both tend to counterbalance the weight of the front section of the boat so that movement of the front section between its fully extended and fully overlying positions may be accomplished by the exertion of relatively light forces.

Figure 21:
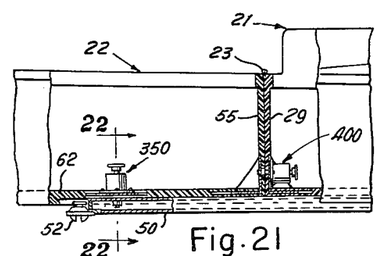
FIGURE 21 is a side view, partly in section, of the boat provided with the securing means illustrated in FIGURE 20.

In FIGURES 21 through 23 are illustrated modified forms of the coupling means for securing the front section to the keel and draw bar member 50 and for securing the front wall 29 of the rear section to the rear wall 55 of the front section.

The securing means 350 includes a support plate 351 embedded in the bottom 62 of the front section having brace members 352 and 353 which extend angularly outwardly of the support plate and are also embedded in the bottom 62 which is of suitable plastic material. The support plate has an upstanding collar 355 secured to the main plate in any suitable manner, as by weld 356. The collar has a longitudinal internally threaded bore which is aligned with an aperture 358 of the support plate whereby the connector rod 360 may extend through the bore of the collar and through the aperture of the support plate, an aperture 362 in the bottom of the boat into a collar 363. The collar 363 extends into the keel and draw bar member 50 through a suitable aperture and is rigidly secured thereto in any suitable manner, as by a weld 363. An O-ring 365 or other suitable sealing means is disposed in a recess 366 of the bottom 62 of the front section immediately above the keel and draw bar member to seal between the collar and the bottom to prevent passage of moisture between the keel and draw bar member and the bottom into the apertures 362 and 358.

The connector rod is enlarged and threaded at its lower end portion 368 whereby its threads are engageable in the collars 355 and 363. The coupling rod has a disk 370 provided with a flange 372. The disk 370 is rigidly connected to the rod by any suitable means, such as the weld 373. A sealing means, such as a gasket 375, is disposed within the annular flange 375 and between the disk 370 and the upper surface of the collar 355. The resilient gasket 375 tends to protrude downwardly of the flange 372 whereby it seals between the collar and the coupling rod 360 when the gasket is compressed against the collar 355.

The connector rod extends through an aperture in the circular top 379 of a substantially hat shaped retainer 380 which includes a cylindrical section 383 provided with an outwardly extending circular flange 386 secured to the supporting plate 351 by screws 387 which extend into suitable threaded bores in the support plate. A gasket 388 is disposed between the flange 386 in the support plate to provide a moisture tight seal therebetween. The disk 370 of the coupling rod is also adapted to engage and compress a gasket 390 disposed in an undercut annular recess 391 of the top 379 of the retainer 380.

It will now be apparent that when it is desired to secure the front section 22 in its fully extended position relative to the rear section 21 and to the keel and draw bar member 50, the connector rod is rotated by means of its handle downwardly from engagement with the coupling collar 355 into the collar 363. During this movement of the connector rod toward its fully operative position, the gasket 375 engages the top surface of the collar 355 and is compressed thereagainst to prevent passage of moisture between the collar and the disk 370 into the retainer 380. When the gasket is fully compressed, the flange 372 engages the upper surface of the collar 355 so that further continued rotation of the connector rod now causes the front section to be pulled down tightly against the keel and draw bar member.

When it is desired to disconnect the front section from the keel and draw bar member 50, the connector rod is rotated in the opposite direction causing the threaded portion 368 of the rod to engage the threaded bore of the collar 355 and move out of engagement with the threaded bore of the collar 363. As the rotation of the coupling rod is continued its lower threaded end moves out of engagement with the threaded bore of the collar 363 whereby the front section is disconnected from the keel and draw bar member 50 and, since the threaded portion is now in threaded engagement with the bore 350 of the collar 355, continued rotation causes the disk 370 to contact the upper gasket 390 to compress it and cause it to seal between the top 379 of the retainer 380 and the coupling rod whereby the gasket prevents passage of moisture therebetween.

The front wall 29 of the rear section and the rear wall 55 of the front section may be connected by a coupling means 400 instead of the boss 53 and socket 54 and pin 58 means illustrated in the above mentioned co-pending applications and in FIGURES 1 and 5. The coupling means 400 include an L-shaped support plate 401 having an upright leg 402 embedded in and bonded to the wall 55 of the front section 22 and a leg 403 embedded in and bonded to the bottom 62 of the front section. A pair of gussets 404 may extend between the legs 402 and 403 and be rigidly secured thereto in any suitable manner as by welding to brace the legs action. A coupling collar 406 extends through aligned apertures in the wall 55 and the leg 402 of the angle member and is rigidly secured to the angle member in any suitable manner, as by a weld 407. Brace members 408 and 409 may extend angularly outwardly from the horizontal legs 403 and 402, respectively, of the angle members and be similarly embedded in the bottom and rear wall of the front section to strengthen the bond between the angle member and the front section.

A similar angle member 410 has legs 411 and 412 which are embedded in the front wall 29 and the bottom 26 thereof. The legs 411 and 412 may be provided with brace members 413 and 414, respectively, which are embedded in the plastic front wall 29 and bottom 26 of the rear section. A retainer 415 is secured to the leg 411 by screws 416 which extend through suitable apertures in the outwardly extending annular flange 418 of the retainer into suitable threaded bores in the leg 411. A gasket 420 is interposed between the flange 418 and the leg 411 to provide a moisture-tight seal therebetween. The connector rod 421 extends through aligned apertures in the top 423 of the retainer and the threaded bore of the coupling collar 425, rigidly secured to the leg 411 by weld 426, the aligned apertures 427 and 428 in the leg 411 and the front wall 29, respectively, into the threaded bore of the coupling collar 406.

The connector rod has a disk 430 rigidly secured thereto by a weld 421. The disk has an annular flange 432 in which is retained the resilient gasket 433 adapted to bear against the end surface of the coupling collar 425 to seal between the coupling rod and the coupling collar. The top 423 of the retainer is provided with an undercut recess in which is disposed the annular resilient gasket 435. The front surface of the front wall 29 of the rear section is provided with a recess in which is disposed an O-ring 436, or any other suitable sealing means, for sealing between the collar 406 and the front wall 29 to prevent the passage of water therebetween to the threaded bore of the coupling collar 406 and to the aperture 427.

It will be apparent that the coupling means 400 functions in exactly the same manner as the coupling means 350. It will be apparent that when the connector rod 421 is rotated in one direction by means of its handle 440, the threaded end portion 441 of the coupling rod engages in the threaded bore of the coupling collar 406 and moves out of engagement with the threaded bore of the coupling collar 425 thus causing the disk 430 to move towards the coupling collar 425. During such movement the resilient gasket 433 which normally extends outwardly of the flange 432 of the disk 430 engages the coupling collar 425 and is compressed thereagainst to insure a fluid-tight seal therebetween. Further rotation of the wheel 440 then causes the front and rear walls 29 and 55 of the rear and front sections, respectively, to be drawn or stressed toward one another.

When it is desired to unlatch or unlock the two sections to permit the front section to be pivoted about its hinge 23 to a position overlying the rear section, the connector rod 421 is rotated in the opposite direction to cause its threaded end portion 441 to move out of engagement with the coupling collar 406 and into engagement with the coupling collar 425 whereby the front section is released for upward pivotal movement about the hinge 23 and the gasket 435 is compressed by the disk 430 to prevent any flow of water through the aperture 428 into the interior of the rear section.

While only one coupling assembly 400 has been illustrated and described, it will be apparent that two, three or more coupling assemblies may be employed to secure the front and rear walls of the rear end front sections, respectively, of a boat to one another.

It will now be seen that a new and improved coupling assembly 350 or 400 has been illustrated and described for securing two members of a sectional boat to one another under stress whereby the two sections of a sectional boat are held in very rigid relation to one another.

Figure 25:
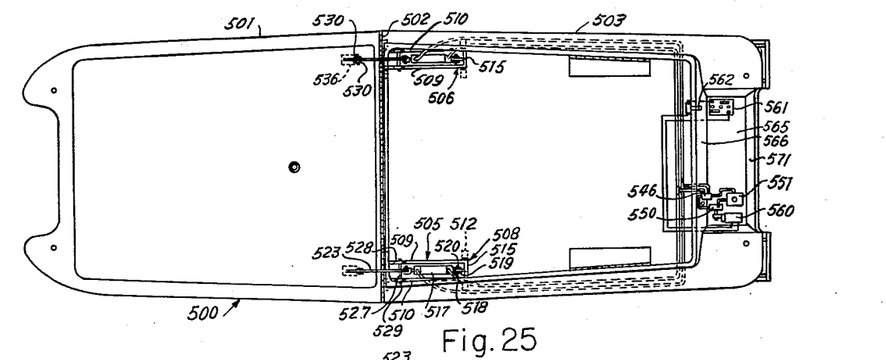
FIGURE 25 is a top view of a sectional boat showing a power means for moving the front section between its fully extended position and its position overlying the rear section.
Figure 26:
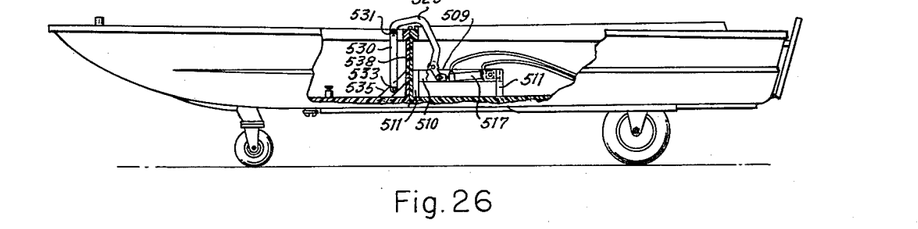
FIGURE 26 is a side view of the boat illustrated in FIGURE 25, with some portions broken away to reveal the power means and with the forward section of the boat in its fully extended position.
Figure 27:
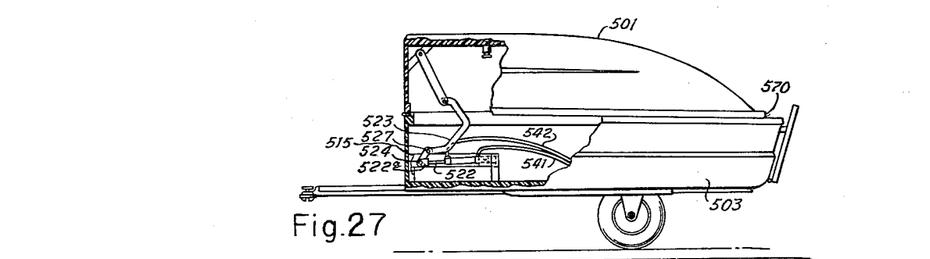
FIGURE 27 is a view similar to FIGURE 26 showing the forward section in its position overlying the rear section.

In FIGURES 25 through 28 is illustrated a power system for a boat 500 for moving the front or forward section 501 of the boat about the hinge or pivot 502 between the fully extended position illustrated in FIGURES 25 and 26 and its position overlying the rear section 503 illustrated in FIGURE 27. The rear section of the boat is provided with a pair of hydraulic ram assemblies 505 and 506 which are identical construction and whose corresponding elements will therefore be provided with identical reference characters. Each of the hydraulic ram assemblies includes a mounting 508 having a pair of spaced laterally spaced longitudinal side members 509 and 510 rigidly mounted on and secured to the rear section of the boat adjacent but spaced above the bottom thereof by means of vertical members 511 whose lower ends are provided with brace plates 512 embedded in the bottom or otherwise rigidly secured thereto. The longitudinally extending members 509 and 510 may be connected at their opposite ends by lateral members 515. The hydraulic ram cylinder 517 is provided at its rear end with laterally spaced lugs 518 between which is received the connecting lug 519 of the rear lateral member 515 of the mounting 508. A pivot pin or bolt 520 extends through aligned apertures in the ram cylinder lugs and the connector lug to provide for pivotal connection of the ram cylinder to the mounting.

The forwardly extendable piston rod 522 extending outwardly of the ram cylinder is provided at its forward end with a bifurcated bracket 522a in which is received the lower end of an operating lever 523. A bolt or pivot pin 524 which extends through aligned apertures in the lever 523 and the bifurcated bracket 522 of the piston rod pivotally connects the piston rod to the operating lever. The operating lever 523 is pivotally mounted on the longitudinally extending members 509 and 510 of the mounting 508 by a pivot pin 527 which extends through suitably aligned apertures in its operating lever and in the upstanding lugs or arms 528 and 529 of the longitudinally extending members 509 and 510, respectively.

The lever 523 is of proper configuration to have its forward portion extend over the forward portion of the rear section and the rear portion of the front section of the boat and to pivotally connect with the upper end of a pair of spaced links 530. The lever is pivotally connected to the links 530 by a bolt or pivot pin 531. The lower ends of the links 530 are pivotally connected, as by a bolt or pivot pin 533, to a diagonally extending bar 535 in the front section of the boat whose lower forward end portion may be provided with a brace plate 536 imbedded or otherwise rigidly secured to the bottom of the front section and whose upper and rear end is provided with a similar brace plate similarly imbedded in or otherwise rigidly secured to the rear wall 538 of the front section.

It will be apparent that when the piston rods of the power assemblies 505 and 506 move from their fully retracted positions in the ram cylinders 517 to the fully extended positions illustrated in FIGURE 27, the operating levers 523 are caused to pivot in a clockwise direction about their pivot pins 527 whereby the forward or front section of the boat is caused to pivot in a clockwise manner about its hinge pin 502 to the fully closed position illusrated in FIGURE 27. When the piston rods 522 of the power assembles 505 and 506 are caused to move into the ram cylinders from their fully extended positions toward their fully retracted positions, the operating lever 523 is caused to pivot in a counter-clockwise manner about its pivot pin 527 thereby causing the front section to pivot in a counter-clockwise manner about its hinge pin 502 from the position wherein it overlies the rear section 503 to its fully extended position.

It will be apparent that during such movement of the front section between its extreme positions relative to the rear section, the power assemblies must first exert a force lifting the forward section until the forward section has attained a substantially vertical position and then exert a braking action to prevent unrestrained downward movement of the front section either in a clockwise direction or in a counter-clockwise direction from its substantially vertical position.

Figure 28:
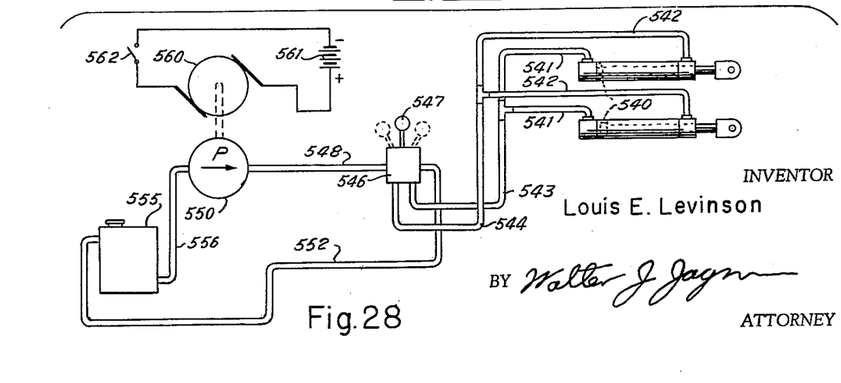
FIGURE 28 is a schematic view of the power system for moving the forward section between its fully extended position and its position overlying the rear section.
Figure 29:
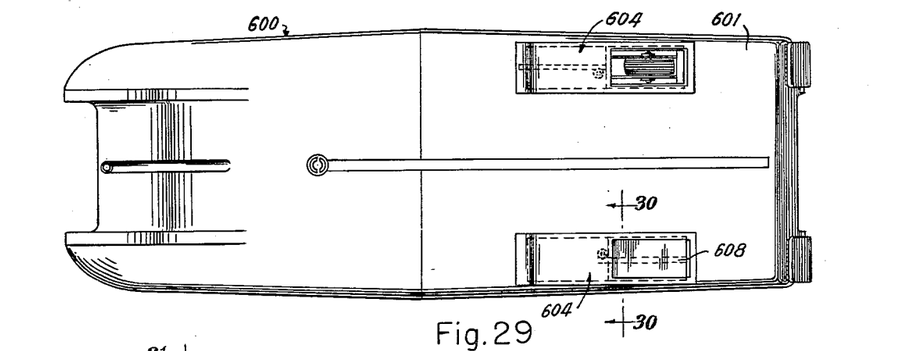
FIGURE 29 is a bottom view of a modified form of the boat having slidable doors for closing the lower ends of the wheel wells.

Each of the piston rods is provided at its inner end with a piston 540 and the ram cylinders are provided at opposite ends with fluid conduits 541 and 542 through which fluid may enter into or escape from the ram cylinder on opposite sides of the piston. Conduits 541 are connected to the conduit 543 while the fluid conduits 542 are connected to the conduit 544. The conduits 543 and 544 are connected to any suitable selector valve 546 having an operating lever 547 to connect the conduit 543 to the outlet conduit 548 of the pump 550 and simultaneously connect the conduit 544 to the conduit 552 which opens in to the reservoir tank 555. Conversely the selector valve also may connect the conduit 544 to the outlet conduit 548 of the pump and simultaneously connect the conduit 543 to the conduit 552. The inlet conduit 556 of the pump 550 is connected to the reservoir 555.

The pump is driven by an electric motor 560 which is connected to the battery 561 by means of the key switch 562. The pump, battery and reservoir are mounted in motor well 565 of the rear section and the key switch is mounted on the wall 566 of the motor well where it is assessible to permit insertion of the key therein when the forward section is in the position fully overlying and closing the rear section. The selector valve 546 is similarly mounted on the wall 566 where it is accessible.

It will now be seen that the power system may be used to move the front section 501 between its fully extended position and its position overlying the rear section 503 by means of the power system. It will be noted that when the front section 501 is in the position illustrated in FIGURE 27 and it is desired to move the front section to the fully extended section illsutrated in FIGURE 26, the operator may insert an arm downwardly below the edge 570 of the front section into the well 565 of the rear section, since the upper edge of the transom 571 is then disposed below the front section 501, to manipulate the selector valve 546 and to insert the key into the key switch 562. With the operating handle 547 of the selector valve in proper position, closing of the switch 562 by means of the key causes the electric motor to be energized and hydraulic fluid under pressure is caused to be directed to the ram cylinders through the conduits 542 from the pump 550 while simultaneously the conduits 541 are placed in communication with the conduits 552 and thus the reservoir 555. As a result the pistons will move rearwardly into the ram cylinders causing the levers 523 to pivot in a counter-clockwise manner about the pivot pins 527 until the front section is pivoted about its hinge pin 502 to a substantially vertical position relative to the rear section. Further pivotal movement of the front section in a counter-clockwise direction will now cause its weight to be effective to tend to move it downwardly to its fully extended position. Since the admittance of the fluid to the cylinder through the conduits 542 is controlled by the selector valve and since fluid may not flow past the pistons 540 in the cylinders, the pistons and the hydraulic fluid in the system will exert a braking force on the front section controlling such downward movement of the front section from its vertical position. It will be course be apparent that the selector valve may at any time be reversed to cause the conduits 541 to be connected to the outlet 548 of the pump to cause reverse movement of the pistons and therefore of the front section. In this manner the front section may be moved by the power system from the position overlying the rear section to its fully extended position.

When it is desired to move the front section from its fully extended position to the position overlying the rear seciton 502 the selector valve is operated to cause the conduits 541 to be connected to the outlet conduit 543 of the pump while simultaneously the conduits 542 are placed in communication with the conduit 552. Energization of the motor 560 by closure of the switch 562 now causes fluid under pressure to be admitted to the rear ends of the ram cylinders causing the pistons and piston rods to move forwardly whereby the front section is pivoted in a clockwise manner about the hinge pin 502 until it is in a substantially vertical position relative to the rear section. Further downward movement of the rear section under the influence of gravity in a clockwise manner is then braked or regulated by the selector valve so that it will move slowly and at a controlled rate to the position overlying the rear section 503. It will thus be seen that the power section permits movement of the front section between its fully extended position and its position overlying the rear section 503 without any exertion of any force by the operator.

It will further be seen that since the operating levers 523 are pivotally secured by the mountings 508, as are the rear ends of the ram cylinders 517, no portion of the force exerted by the pistons is directed either to the bottom or the front wall of the rear section whereby extremely large forces may be exerted by the hydraulic ram assemblies without undue stresses or strains being imposed on the boat itself.

While hydraulic piston and cylinder means have been shown as the means for operating the levers 523 it will be apparent that a reversible electric motor or solenoid might be used in place of each of the hydraulic ram assemblies, with the electric power thereof being obtained from a battery, such as the battery 561.

In FIGURES 29 through 32 is illustrated a boat 600 whose rear section 601 has a pair of downwardly projecting door housings 604 providing hydroplane surfaces whose forward portions 605 extend downwardly and rearwardly. The door housings are provided with openings 606 which are closable by the sliding plates or doors 608. The housings 604 are each provided with an internal recess 610 forwardly of the opening 606 into which the sliding door 608 may be retracted, the lateral edge portions of the doors being receivable in the lateral parallel inwardly opening recesses 611 in the housings on opposite sides of the opening 606 whereby the doors are supported even when in the fully closed position illustrated in the FIGURES 30 and 31.

Each of the doors is provided with rack gears 612 rigidly mounted on the upper surfaces of the doors which are engaged with a spur gear 613 rigidly mounted on a rod 614 rotatably secured to the wall 615 of the boat defining one side of the wheel well 616, by bearing brackets 619. The upper end of the gear rod 614 terminates below the upper portion of the wheel well whereby the doors 620 which close the tops of the wheel wells are not interfered with by the gear rods. The upper ends of the rods may be of non circle configuration in cross section so that a handle 622 having a socket portion 623 at the lower end thereof may be telescoped thereover to be nonrotatably secured thereto whereby rotation of the handle 622 will effect rotation of the gear rod and therefore of the gear 613. The rack gear is receivable in the recess 625 in the door housing. As is disclosed in my copending application, Serial No. 2,252, filed January 13, 1960, now Patent No. 3,071,786, ground engaging wheels 630 are disposable in the wheel well by means of the rectangular frames 631 pivoted at one end on the shafts 632. The wheels are movable between the upright retracted positions illustrated in FIGURE 31 and have a lower position wherein the wheels protrude below the bottom of the rear section of the boat. In this latter lower position the rectangular frames 631 are clamped against upward movement by means of the toggle clamps 633.

Figures 30, 31, 32, 33, 34:
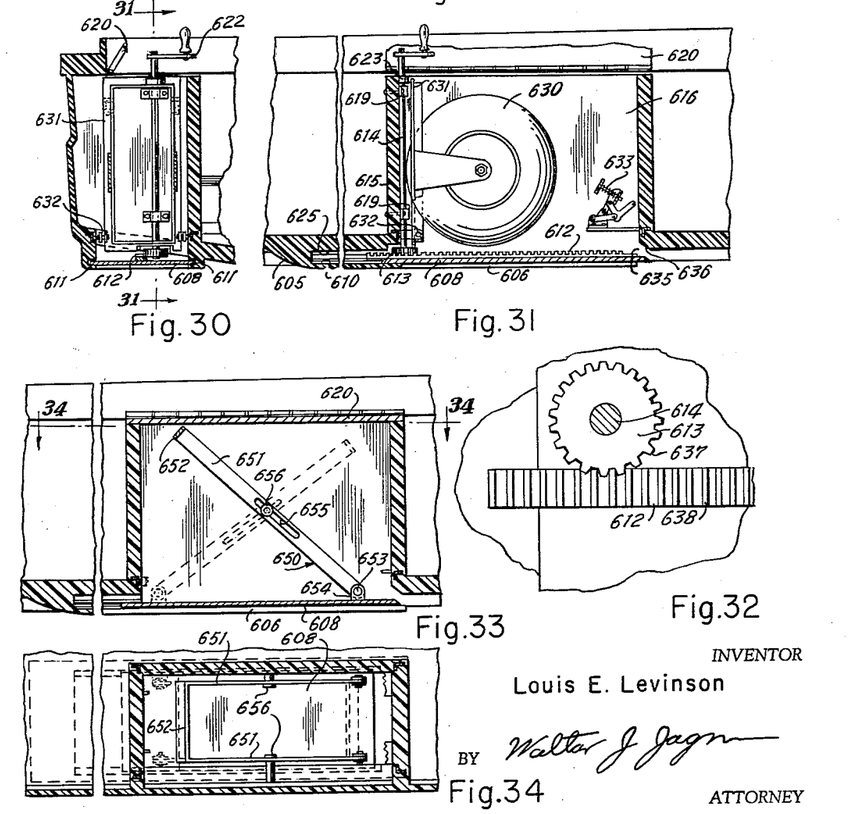
FIGURE 30 is a fragmentary vertical sectional view taken on line 30—30 of FIGURE 29.
FIGURE 31 is a vertical sectional view taken on line 31—31 of FIGURE 30.
FIGURE 32 is a fragmentary view showing rack and gear means for moving the slidable doors illustrated in FIGURES 29 through 31.
FIGURE 33 is a vertical sectional view through a wheel well showing another means for moving the slidable door.
FIGURE 34 is a horizontal sectional view taken on line 34—34 of FIGURE 33.

In use, when it is desired to move a wheel 630 to a retracted position, and close the wheel well, the wheel is moved to its retracted position, illustrated in FIGURE 31, by pivoting the rectangular frames 631 thereof upwardly about its pivot shafts. When the wheel is latched, by any appropriate means, in the retracted position in the wheel well, the handle 622 is secured to the upper end of the gear rod 614 which is then rotated to cause the inter-engagement of the gear 613 with the rack gear 612 to move the sliding plate or door 608 rearwardly until it almost completely closes the bottom apertures 606 of the housings. The rearwardly opening lateral passage 635 between the rear edge of the sliding door panel and a downwardly and rearwardly extending shoulder 636 in the rear end of the door housing then forms a Venturi opening through which water is pulled or drawn out of the wheel well when the boat is moved forwardly through the water. When the wheels are retracted and the sliding doors 608 are closed, forward movement of the boat, when it attains the proper velocity, will cause the boat to rise in the water on the hydroplane surfaces of the door housings whereby the area of the bottom of the boat in engagement with the water is materially reduced thereby permitting the boat to attain a higher speed.

When it is desired to move a wheel to a lower position wherein it extends downwardly below the bottom of the boat, the doors 620 are opened and the handle 622 is engaged with the top of the gear rod 614 and the gear rod is rotated in an opposite direction, to cause the sliding door 608 to move inwardly into the recess 610 of the door housing opening the aperture 606 whereby the wheel may be moved downwardly to protrude below the boat.

It will be noted that the gear 613 has teeth 637 which enter laterally between the vertical sides of the teeth 638 of the rack gear 612. In the event any foreign material such as mud is disposed between the teeth of the rack gear, such foreign material is free to move outwardly from between the rack gear teeth as the teeth 637 move into meshing relation therewith.

In FIGURES 33 and 34 is illustrated another moving means 650 for moving the sliding door 608 between retracted and extended position. The door moving means 650 comprises a U-shaped bracket or handle having legs 651 connected at the upper end by the connecting member 652. The lower ends of the legs are pivotally secured to the rear portions of the door by means of the pins 653 which extend through aligned apertures in the legs and in the upstanding brackets 654 rigid with the doors. Each of the legs is provided with an elongate longitudinally extending slot 655 through which extend shafts 656 which are rigid with the sides of the wheel well. It will be apparent that pivotal movement of the handle 650 in a clockwise direction about the shaft 656 causes the door to move forwardly to its retracted position, the slot 655 and in the legs permitting upward and then downward movement of the handle during such movement. Movement of the handle in a counter-clockwise manner when the door is in the recess 610, moves the door rearwardly to its fully extended closed position. It will be noted that the upper portion of the handle is below the top of the wheel well when the door is either in fully extended or fully retracted position so that the door 620 may be closed. The retractable wheel, not shown in FIGURES 33 and 34, may be mounted in each well by means of any suitable mounting means, such as mounting frames 631 in the same manner as the wheel 630 illustrated in FIGURE 31.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; and doors for closing lower ends of said wheel wells longitudinally movably mounted in said door housings and movable between retracted positions wherein said doors are disposed in said housings and the lower ends of said wheel wells are open and extended closing positions wherein said doors extend below said wheel wells and close the lower ends of the wheel wells.

2. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; and doors for closing lower ends of said wheels wells longitudinally movably mounted in said door housings and movable between retracted positions wherein said doors are disposed in said housings and the lower ends of said wheel wells are open and extended closing positions wherein said doors extend below said wheel wells and close the lower ends of the wheel wells, said doors having rear edges spaced from rear ends of said wheel wells when said doors are in said extended closing positions to provide a downwardly and rearwardly opening aperture which causes water in said wells to be drawn outwardly therethrough when the boat is moved forwardly in the water.

3. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; doors for closing lower ends of said wheel wells longitudinally movably mounted in said door housings and movable between retracted positions wherein said doors are disposed in said housings and the lower ends of said wheels are open and extended closing positions wherein said doors extend below said wheel wells and close the lower ends of the wheel wells; and means connected to said doors and extending into said wheel wells for moving said doors between said extended and retracted positions.

4. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; doors for closing lower ends of said wheel wells longitudinally movably mounted in said door housings and movable between retracted positions wherein said doors are disposed in said housings and the lower ends of the wheel wells are open and extended closing positions wherein said doors extend below said wheel wells and close the lower ends of the wheel wells, said doors having rear edges spaced from rear ends of said wheel wells to provide a downwardly and rearwardly opening aperture when said doors are in said extended closing positions which causes water in said wells to be drawn outwardly therethrough when the boat is moved forwardly in the water; and means connected to said doors and extending into said wheel wells for moving said doors between said extended and retracted positions.

5. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; doors for closing lower ends of said wheel wells longitudinally movably mounted in said door housings and movable between retracted positions wherein said doors are disposed in said housings and the lower ends of the wheel wells are open and extended closing positions wherein said doors extend below said wheel wells and close the lower ends of the wheel wells; and means extending into said wheel wells for moving said doors between extended and retracted positions, said door moving means including a rack gear mounted on each of said doors and a rotatable gear engageable with said rack gear mounted on said boat and, each of said means for moving said doors being accessible through the upper end of its wheel well, rotation of said gears causing movement of said doors between extended and retracted position.

6. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; doors for closing lower ends of said wheel wells longitudinally movably mounted in said door housings and movable between retracted positions wherein said doors are disposed in said housings and the lower ends of the wheel wells are open and extended closing positions wherein said doors extend below said wheel wells and close the lower ends of the wheel wells; and means extending into said wheel wells for moving said doors between said extended and retracted positions, said door moving means including a rack gear mounted on each of said doors and a rotatable gear rotatably mounted on said boat engageable with said rack gear, each of said means for moving said doors being accessible through the upper end of its wheel well, rotation of said gears causing movement of said doors between extended and retracted position, said rack gear having upwardly extending longitudinally spaced teeth, said rotatable gear being disposed for rotation about an axis perpendicular to the axis of movement of said rack gear, said rotatable gear having teeth extending laterally between teeth of the rack gear to force any foreign material between the teeth of said rack gear outwardly therefrom on moving into meshing relation with said rack gear teeth.

7. A boat having a bottom and a pair of wheel wells extending upwardly from the bottom and opening downwardly of the bottom; a pair of longitudinally extending door housings on the bottom extending forwardly of the wheel wells and providing laterally spaced hydroplane surfaces; doors for closing lower ends of said wheel wells longitudinally movably mounted in said door housings and movable between retracted positions wherein said doors are disposed in said housings and the lower ends of the wheel wells are open and extended closing positions wherein said doors extend below said wheel wells and close the lower ends of the wheel wells; and means extending into said wheels wells for moving said doors between said extended and retracted positions, each of said means including a lever pivotally mounted in its wheel well and having a lower end pivotally secured to the rear portion of its door, said pivotal mounting of said lever permitting vertical as well as pivotal movement of said lever relative to said wheel well.

8. A boat having a bottom and a pair of wheel wells extending upwardly from the bottom and opening downwardly of the bottom; a pair of laterally spaced longitudinally extending door housings on the bottom extending forwardly of said wheel wells and providing laterally spaced hydroplane surfaces spaced downwardly of said bottom; doors for closing lower ends of said wheel wells longitudinally movably mounted in said door housings for movement between retracted positions wherein said doors are disposed in said housings and the lower ends of the wheels are open and extended closing positions wherein said doors extend below said wheel wells and close the lower ends thereof, said door housings having internal recesses disposed forwardly of the lower ends of the wheel wells in which the doors are disposed when in said retracted positions and having longitudinally extending inwardly opening recesses on opposite sides of the lower ends of the wheel wells, each of said doors having lateral edge portions receivable in said inwardly opening recesses of its housing whereby said doors are supported by said housings when in extended positions closing the lower ends of said wheel wells, said wheel wells and said doors having spaced rear surfaces when said doors are in extended closing positions providing a downwardly opening aperture communicating the lower rear end portion of each of said wheel wells with the exterior for causing water in said wheel wells to be drawn therethrough from the wheel wells when the boat is moved forwardly in the water.

References Cited in the file of this patent

UNITED STATES PATENTS

| | | |
|---|---|---|
| 1,127,842 | Zgliczynski | Feb. 9, 1915 |
| 1,741,318 | Kroh | Dec. 31, 1929 |
| 2,157,186 | Pinter et al. | May 9, 1939 |
| 2,266,661 | Smith | Dec. 16, 1941 |
| 2,533,220 | Carter | Dec. 12, 1950 |
| 2,548,274 | Van Oeveren | Apr. 10, 1951 |
| 2,566,572 | Lindsey | Sept. 4, 1951 |
| 2,833,296 | Woodruff | May 6, 1958 |
| 2,890,466 | Bly | June 16, 1959 |
| 2,893,019 | Renfroe et al. | July 7, 1959 |